United States Patent
Kelly et al.

(10) Patent No.: US 10,501,659 B2
(45) Date of Patent: Dec. 10, 2019

(54) METHOD OF MAKING A FUSER MEMBER

(71) Applicant: Xerox Corporation, Norwalk, CT (US)

(72) Inventors: Matthew M. Kelly, West Henrietta, NY (US); Yu Qi, Penfield, NY (US); Timothy L. Harper, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 516 days.

(21) Appl. No.: 14/693,625

(22) Filed: Apr. 22, 2015

(65) Prior Publication Data

US 2016/0312068 A1 Oct. 27, 2016

(51) Int. Cl.
| | |
|---|---|
| *C09D 201/04* | (2006.01) |
| *C08K 3/04* | (2006.01) |
| *G03G 15/20* | (2006.01) |
| *C09D 7/40* | (2018.01) |

(52) U.S. Cl.
CPC ............. *C09D 201/04* (2013.01); *C09D 7/70* (2018.01); *G03G 15/206* (2013.01)

(58) Field of Classification Search
None
See application file for complete search history.

(56) References Cited

U.S. PATENT DOCUMENTS

| | | | | |
|---|---|---|---|---|
| 6,830,710 | B2 * | 12/2004 | Bonnet | B82Y 30/00 252/502 |
| 2006/0292360 | A1 | 12/2006 | Hays et al. | |
| 2008/0152896 | A1 * | 6/2008 | Moorlag | G03G 15/2057 428/323 |
| 2010/0086787 | A1 * | 4/2010 | Qi | C09D 127/16 428/421 |

FOREIGN PATENT DOCUMENTS

CA         2614693 C        6/2011

\* cited by examiner

*Primary Examiner* — Callie E Shosho
*Assistant Examiner* — Patrick N English
(74) *Attorney, Agent, or Firm* — Hoffman Warnick LLC

(57) ABSTRACT

Described herein is a method of manufacturing a fuser member. The method includes mixing a high load fluoropolymer/carbon nanotube composition in a high shear mixer. The method includes mixing the high load fluoropolymer/carbon nanotube composition in the high shear mixer for 3 or more times. A fluoropolymer is added to the high load fluoropolymer/carbon nanotube composition to form a low load fluoropolymer/carbon nanotube composition. The low load fluoropolymer/carbon nanotube composition is mixed in a rubber compounding mixer for 3 or more times. The low load fluoropolymer/carbon nanotube composition is coated on a fuser substrate, cured and polished.

20 Claims, 7 Drawing Sheets

METHOD OF MAKING A FUSER MEMBER

BACKGROUND

Field of Use

This disclosure is generally directed to a process for manufacturing fuser surface layers useful in electrophotographic imaging apparatuses, including digital, image on image, and the like.

Background

Coatings using carbon nanotubes (CNTs) dispersed in a fluoropolymer are employed as fuser release layers or topcoats for various electrostatic printing systems. Incorporating CNTs into a polymer matrix is problematic in that agglomerates of CNTs occur. When CNT agglomerates occur, the release layer of the fuser member is not homogenous and print defects can occur. It would be desirable to have a process which eliminates agglomerates in the fluoropolymer/carbon nanotube dispersion.

SUMMARY

According to an embodiment, there is provided a method of manufacturing a fuser member suitable for use with an image forming system. The method includes mixing a high load fluoropolymer/carbon nanotube composition wherein the carbon nanotubes are from about 8 weight percent to about 30 weight percent of the composition in a mixer. The method includes mixing the high load fluoropolymer/carbon nanotube composition in a high shear mixer for 3 or more times. Fluoropolymer is added to the high load fluoropolymer/carbon nanotube composition to form a low load fluoropolymer/carbon nanotube composition wherein the carbon nanotubes are from about 0.1 weight percent to about 7 weight percent of the composition. The low load fluoropolymer/carbon nanotube composition is mixed in rubber compounding mixer for 3 or more times. The low load fluoropolymer/carbon nanotube composition is coated on a fuser substrate. The coated fluoropolymer/carbon nanotube composition is cured to form a fuser release layer on the fuser substrate and the release layer is polished.

According to another embodiment, there is described a surface layer including a fluoropolymer and a plurality of carbon nanotubes where each carbon nanotube having an aspect ratio ranging from about 10 to about 1,000,000. The surface layer contains carbon nanotube fluoropolymer clusters having a size ranges from about 5 micron to about 250 micron. The carbon nanotube fluoropolymer clusters are from about 0.01 volume percent to about 15 volume percent of the surface layer.

According to another embodiment, there is provided a fuser member including a substrate layer, an intermediate layer disposed on the substrate layer and a release layer disposed on the intermediate layer. The release layer includes a fluoropolymer, a plurality of carbon nanotubes, each carbon nanotube having an aspect ratio ranging from about 10 to about 1,000,000. The release layer contains carbon nanotube fluoropolymer clusters having a size ranges from about 5 micron to about 250 micron. The carbon nanotube fluoropolymer clusters are from about 0.01 volume percent to about 15 volume percent of the release layer.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
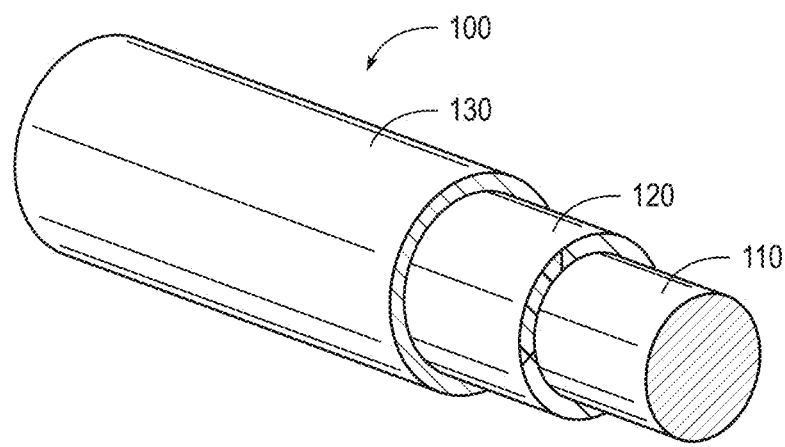
FIG. 1 depicts an exemplary fusing member having a cylindrical substrate in accordance with the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

In various embodiments, the fixing member can include, for example, a substrate, with one or more functional layers formed thereon. The substrate can be formed in various shapes, e.g., a cylinder (e.g., a cylinder tube), a cylindrical drum, a belt, or a film, using suitable materials that are non-conductive or conductive depending on a specific configuration, for example, as shown in FIGS. 1 and 2.

Figure 2:
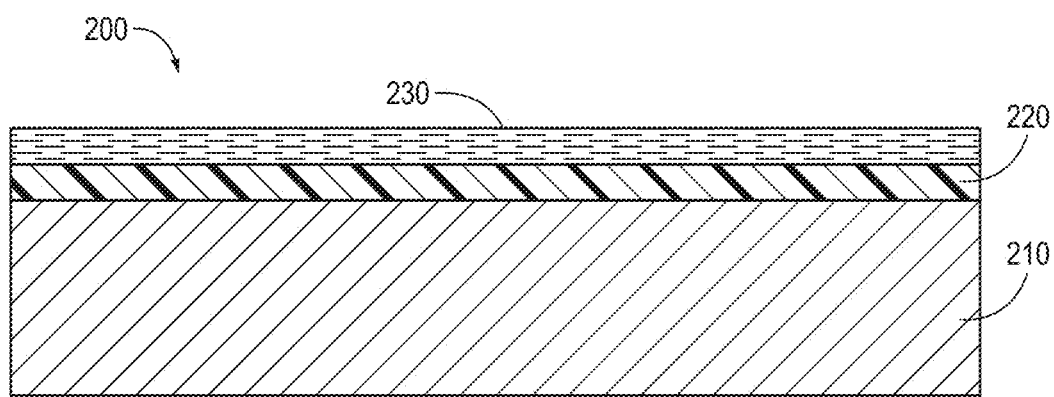
FIG. 2 depicts an exemplary fusing member having a belt substrate in accordance with the present teachings.

Specifically, FIG. 1 depicts an exemplary fixing or fusing member 100 having a cylindrical substrate 110 and FIG. 2 depicts another exemplary fixing or fusing member 200 having a belt substrate 210 in accordance with the present teachings. It should be readily apparent to one of ordinary skill in the art that the fixing or fusing member 100 depicted in FIG. 1 and the fixing or fusing member 200 depicted in FIG. 2 represent generalized schematic illustrations and that other layers/substrates can be added or existing layers/substrates can be removed or modified.

In FIG. 1, the exemplary fixing member 100 can be a fuser roller having a cylindrical substrate 110 with one or more functional layers 120 (also referred to as intermediate layers) and an outer layer 130 formed thereon. In various embodiments, the cylindrical substrate 110 can take the form of a cylindrical tube, e.g., having a hollow structure including a heating lamp therein, or a solid cylindrical shaft. In FIG. 2, the exemplary fixing member 200 can include a belt substrate 210 with one or more functional layers, e.g., 220 and an outer surface 230 formed thereon.

Substrate Layer

The belt substrate 210 (FIG. 2) and the cylindrical substrate 110 (FIG. 1) can be formed from, for example, polymeric materials (e.g., polyimide, polyaramide, polyether ether ketone, polyetherimide, polyphthalamide, polyamide-imide, polyketone, polyphenylene sulfide, fluoropolyimides or fluoropolyurethanes) and metal materials (e.g., aluminum, nickel or stainless steel) to maintain rigidity and structural integrity as known to one of ordinary skill in the art.

Intermediate Layer or Functional Layer

Examples of materials used for the functional intermediate layer 220 (also referred to as cushioning layer or intermediate layer) include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Other examples of the materials suitable for use as functional intermediate layer 220 also include fluoroelastomers. Fluoroelastomers are from the class of 1) copolymers of two of vinylidenefluoride, hexafluoropropylene, and tetrafluoroethylene; such as those known commercially as VITON A 2) terpolymers of vinylidenefluoride, hexafluoropropylene, and tetrafluoroethylene those known commercially as VITON B®; and 3) tetrapolymers of vinylidenefluoride, hexafluoropropylene, tetrafluoroethylene, and cure site monomer those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a Trademark of E.I. DuPont de Nemours, Inc. The cure site monomer can be 4-bromoperfluorobutene-1, 1,1-dihydro-4-bromoperfluorobutene-1,3-bromoperfluoropropene-1, 1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR, FOR-LHF®, NM® FOR-THF®, FOR-TFS® TH® NH®, P757® TNS®, T439® PL958® BR9151® and TN505®, available from Ausimont.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

The thickness of the intermediate layer 220 is from about 30 microns to about 1,000 microns, or from about 100 microns to about 800 microns, or from about 150 microns to about 500 microns.

Release Layer

An exemplary embodiment of a release layer 130 (FIG. 1), 230 (FIG. 2) includes a fluoropolymer. Fluoropolymers suitable for use in the formulation described herein include fluorine-containing polymers. These polymers include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymers of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP) and a cure site monomer, and mixtures thereof. The fluoropolymer particles provide chemical and thermal stability and have a low surface energy. The fluoropolymer particles have a melting or curing temperature of from about 150° C. to about 360° C. or from about 200° C. to about 330° C. These particles are melted or cured to form the release layer. The release layer contains carbon nanotubes dispersed within the fluoropolymer.

For the fuser member 100 (FIG. 1) 200 (FIG. 2), the surface layer or release layer 130 (FIG. 1) 230 (FIG. 2) can have a thickness of from about 10 microns to about 100 microns, or from about 20 microns to about 80 microns, or from about 40 microns to about 60 microns.

Other additives and additional conductive or non-conductive fillers may be present in the substrate layers 110 (FIG. 1) and 210 (FIG. 2), the intermediate layers 120 (FIG. 1) and 220 (FIG. 2) and the release layers 130 (FIG. 1) and 230 (FIG. 2). In various embodiments, other filler materials or additives including, for example, inorganic particles, can be used for the coating composition and the subsequently formed surface layer. Additional conductive fillers used herein may include carbon blacks such as carbon black, graphite, fullerene, acetylene black, fluorinated carbon black, and the like; metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof. Certain polymers such as polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixtures thereof can be used as conductive fillers. In various embodiments, other additives known to one of ordinary skill in the art can also be included to form the disclosed composite materials.

Adhesive Layer

Optionally, any known and available suitable adhesive layer may be positioned between the release layer 130 (FIG. 1), 230 (FIG. 2), the intermediate layer 120 (FIG. 1), 220 (FIG. 2) and the substrate. 110 (FIG. 1), 210 (FIG. 2). Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 2 nanometers to about 2,000 nanometers, or from about 2 nanometers to about 500 nanometers. The adhesive can be coated by any suitable known technique, including spray coating or wiping.

Figure 3A:
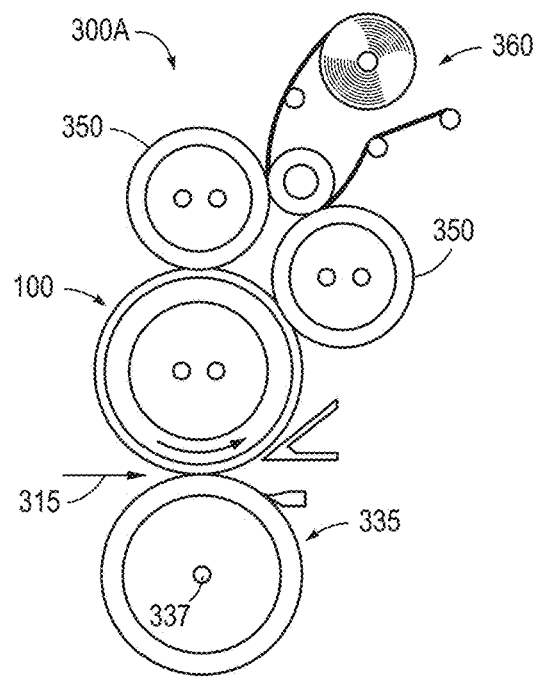
FIGS. 3A-3B depict exemplary fusing configuration using the fuser rollers shown in FIG. 1 in accordance with the present teachings.
Figure 3B:
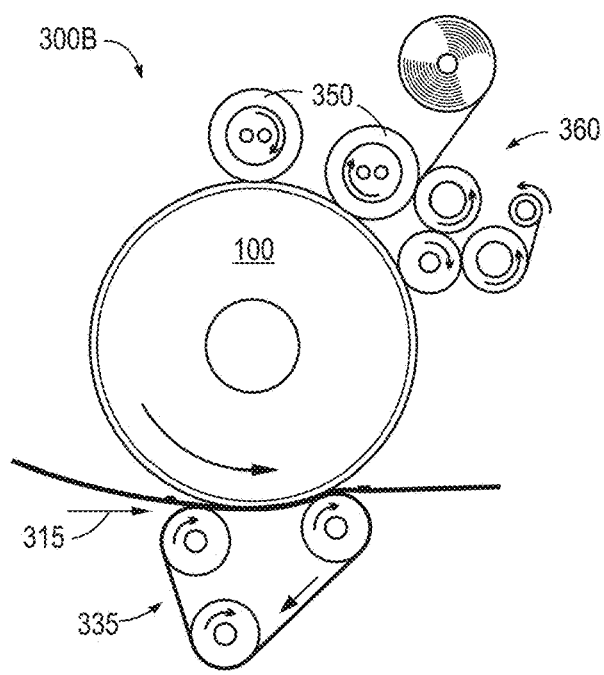
Figure 4A:
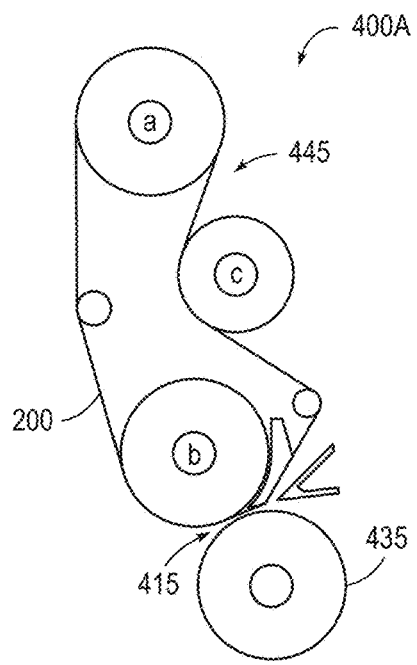
FIGS. 4A-4B depict another exemplary fusing configuration using the fuser belt shown in FIG. 2 in accordance with the present teachings.
Figure 4B:
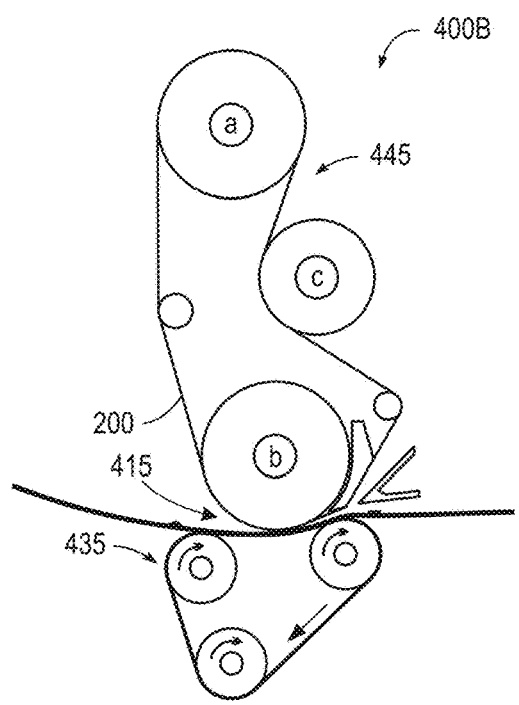

FIGS. 3A-3B and FIGS. 4A-4B depict exemplary fusing configurations for the fusing process in accordance with the present teachings. It should be readily apparent to one of ordinary skill in the art that the fusing configurations 300A-B depicted in FIGS. 3A-3B and the fusing configurations 400A-B depicted in FIGS. 4A-4B represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIGS. 3A-3B depict the fusing configurations 300A-B using a fuser roller shown in FIG. 1 in accordance with the present teachings. The configurations 300A-B can include a fuser roller 100 (i.e., 100 of FIG. 1) that forms a fuser nip with a pressure applying mechanism 335, such as a pressure roller in FIG. 3A or a pressure belt in FIG. 3B, for an image supporting material 315. In various embodiments, the pressure applying mechanism 335 can be used in combination with a heat lamp 337 to provide both the pressure and heat for the fusing process of the toner particles on the image supporting material 315. In addition, the configurations 300A-B can include one or more external heat roller 350 along with, e.g., a cleaning web 360, as shown in FIG. 3A and FIG. 3B.

FIGS. 4A-4B depict fusing configurations 400A-B using a fuser belt shown in FIG. 2 in accordance with the present teachings. The configurations 400A-B can include a fuser belt 200 (i.e., 200 of FIG. 2) that forms a fuser nip with a pressure applying mechanism 435, such as a pressure roller in FIG. 4A or a pressure belt in FIG. 4B, for a media substrate 415. In various embodiments, the pressure applying mechanism 435 can be used in a combination with a heat lamp to provide both the pressure and heat for the fusing process of the toner particles on the media substrate 415. In addition, the configurations 400A-B can include a mechanical system 445 to move the fuser belt 200 and thus fusing the toner particles and forming images on the media substrate 415. The mechanical system 445 can include one or more rollers 445a-c, which can also be used as heat rollers when needed.

Figure 5:
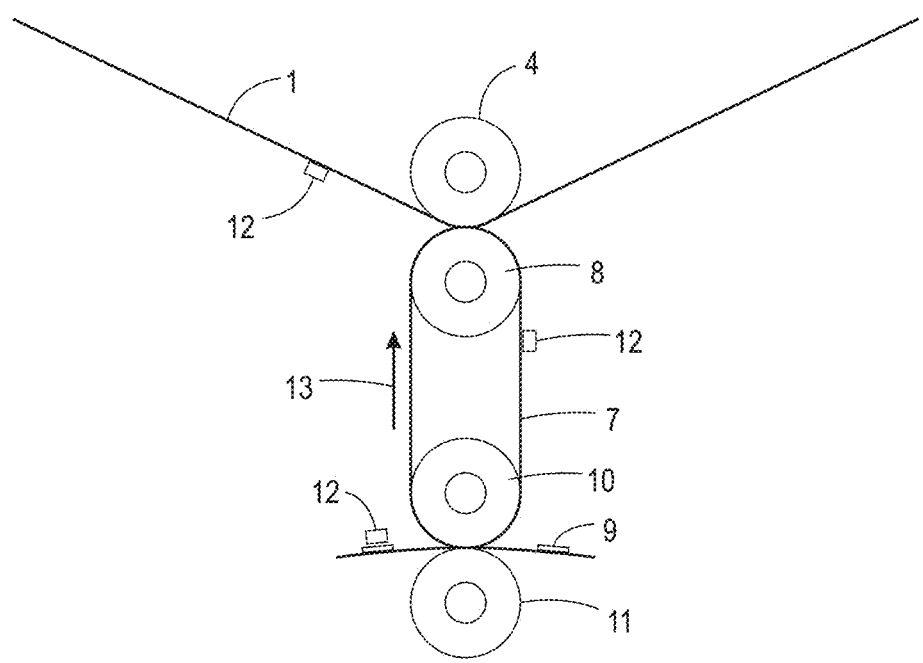
FIG. 5 depicts an exemplary fuser configuration using a transfix apparatus.

FIG. 5 demonstrates a view of an embodiment of a transfix member 7 which may be in the form of a belt, sheet, film, or like form. The transfix member 7 is constructed similarly to the fuser belt 200 described above. The developed image 12 positioned on intermediate transfer member 1 is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

Figure 6:
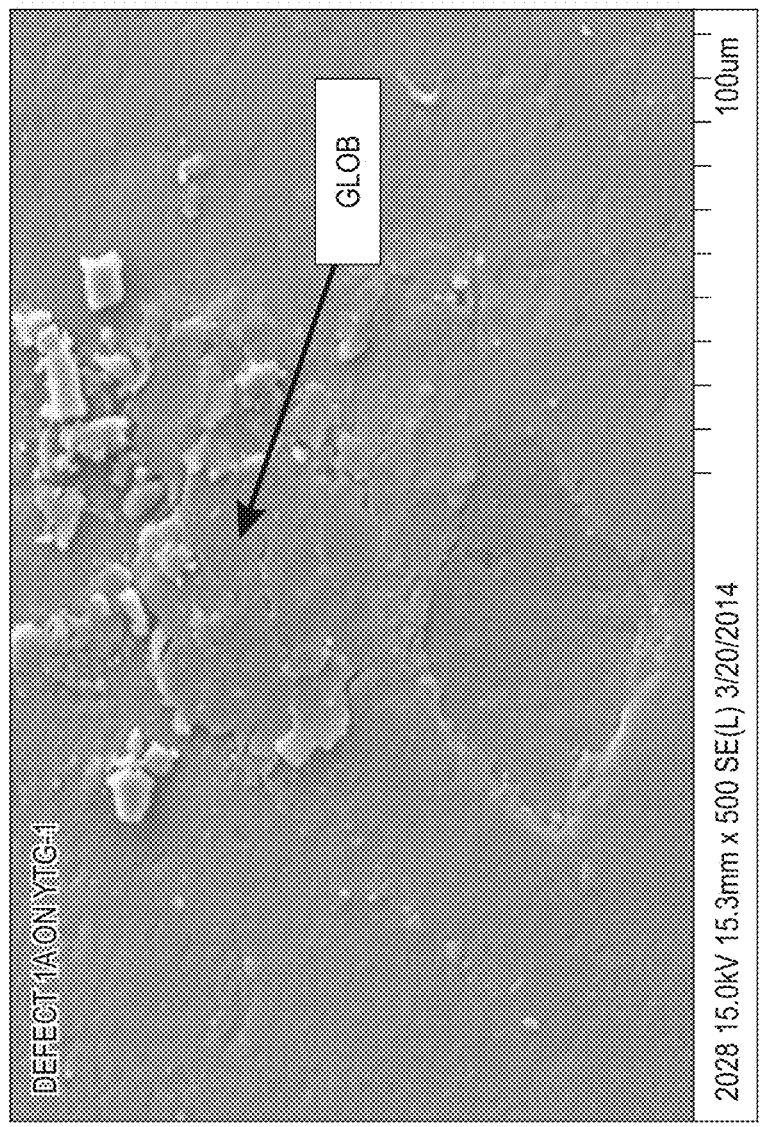
FIG. 6 is a scanning electron microscope image a residual "crater" on a polymer/CNT topcoat surface and toner collecting behind the crater.

Described herein is a method of making a fuser member release layer or surface layer. Visible crater style defects have been detected in fluoropolymer/carbon nanotube release layers. Craters are defined by the topcoat crack propagating through a CNT agglomerate or crater. The cracks have a slight "frown" to them, yet the remainder of the roll surface looks normal. The agglomerate is thought to be more brittle than the roll surface and will sometimes split under fusing pressures and temperatures. FIG. 6 is a scanning electron microscope image a residual "crater" on a polymer/CNT topcoat surface visible after the topcoat polishing step. FIG. 6 shows a crater and a toner "glob" formed behind the crater.

It is theorized that the craters are formed because a portion of a carbon nanotube fluoropolmer agglomerate or cluster has broken off during polishing. The craters are occur throughout the topcoat surface, and are nucleation sites that promote the formation of toner globs on the fuser surface. The toner globs negatively impact image quality. The image quality deterioration is caused by build of toner material that grows in a tear drop shape parallel to the process direction, also referred to as "toner glob." Toner globs are not removed by the cleaning blade and can result in a roll failure due to poor print quality. It is therefore important to reduce carbon nanotube clusters prior to coating and curing.

Disclosed herein is a processing method to improve the dispersion quality as well as significantly reduce the clusters or fluoropolymer/carbon nanotube agglomerations in compositions that are coated, cured and polished to produce a surface layer or in embodiments, a fuser release layer.

High shear mixing of fluoropolymer materials takes place by internal mixing, which can be defined as having the following features: 1) the ability to exert a high localized shear stress to the material being mixed (such as a nip-action), and 2) a lower shear rate stirring (or homogenizing) action. The overall effectiveness of mixing requires both these actions, that is, a combination of high shear stress and large shear deformation. Appropriate internal mixing for the materials mentioned in the above claims can be take place in a variety of forms, which include but are not limited to non-intermeshing or tangential style mixing. Mill mixing can also be utilized to provide appropriate mixing criteria in this instance. Suitable high shear mixers include a CWBrabender internal mixer/twin-screw extruder, a Silverson high shear industrial mixer, a Rotosolver High Shear Mixer, a ROSS Delta Rotor/stator high shear mixer, Banbury Roll Mill Shear Mixing (internal or external), Farrel Roll Mill Shear Mixing (internal or external), or other internal or external non-intermeshing or tangential mixers). Rubber compounding mixers are mixers that are typically used to compound rubber. These include CWBrabender internal mixer/twin-screw extruder, a Banbury Roll Mill Shear Mixing (internal or external) and Farrel Roll Mill Shear Mixing (internal or external).

Figure 7:
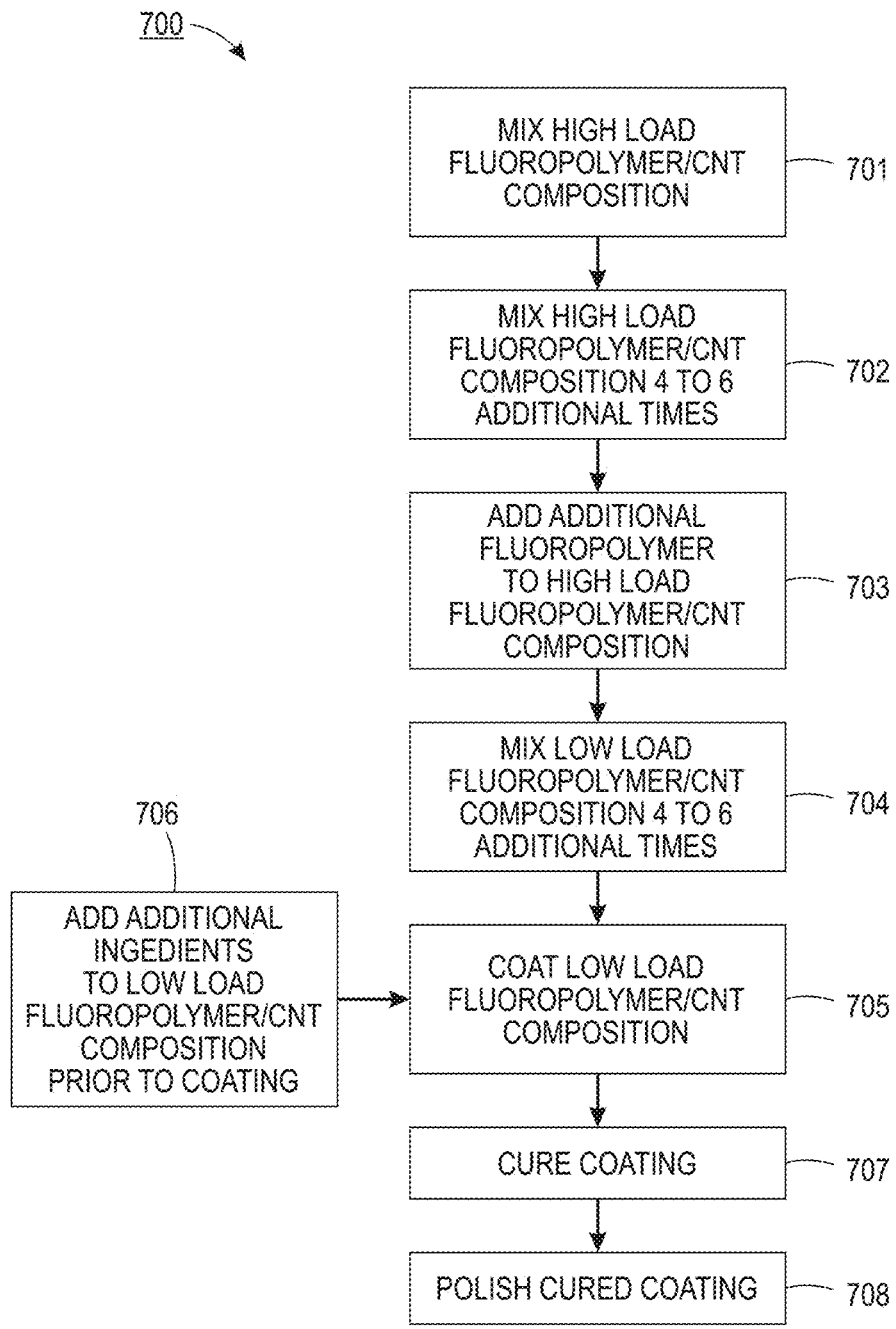
FIG. 7 is a flowchart of the process for manufacturing a fuser surface layer.

A flowchart of for manufacturing a release layer on a fuser member in shown in FIG. 7. The processing method includes mixing a high load fluoropolymer/carbon nanotube composition wherein the carbon nanotubes are from about 8 weight percent to about 30 weight percent of the composition in a mixer (Block 701). The mixer is a high shear mixer such as the mixers listed above. The high load fluoropolymer/carbon nanotube is then mixed for at least 3 times, or in embodiments 4 to 6 additional times (Block 702). The mixer is a high shear mixer. Previous processes only mixed the high load fluoropolymer/carbon nanotube composition one time.

Additional fluoropolymer is added to the high load fluoropolymer/carbon nanotube composition to form a low load fluoropolymer/carbon nanotube composition (Block 703). The low load composition or final composition is the composition that is coated, cured and polished to make the release layer. The carbon nanotubes comprise from about 3 weight percent to about 5 weight percent of the composition.

The low load fluoropolymer/carbon nanotube composition is than mixed an additional at least 3 more times, or in embodiments 4 to 6 times (Block 704). The mixer is a rubber compounding mixer.

The low load fluoropolymer/carbon nanotube composition can be coated on a fuser substrate, such as an intermediate layer or substrate as described previously (Block 705). Prior to coating the low load fluoropolymer/CNT composition, additional ingredients can be added. These additional ingredients include organic solvents, surfactants and crosslinkers (Block 706).

The coating is then cured at an elevated temperature (Block 707). The cured coating is then polished to produce a surface roughness of from about 0.6 microns to about 1.3 microns (Block 708).

The high load and low load fluoropolymer/carbon nanotube compositions are in the following ranges When the high load fluoropolymer/carbon nanotube composition is from 8 weight percent to 15 weight percent, the low load range fluoropolymer/carbon nanotube composition is from 0.1 weight percent to 2.5 weight percent. When the high load fluoropolymer/carbon nanotube composition is from 15.1 weight percent to 23 weight percent, the low load range fluoropolymer/carbon nanotube composition is from 2.6 weight percent to 5.0 weigh percent. When the high load fluoropolymer/carbon nanotube composition is from 23.1 weight percent to 30 weight percent, the low load range fluoropolymer/carbon nanotube composition is from 5.1 weight percent to 7.0 weigh percent. The process disclosed reduces the size of the carbon nanotube fluoropolymer clusters to about 5 to 250 microns.

Fluoropolymers suitable for use as the release layer fluoroplastics comprising a monomeric repeat unit that is selected from the group consisting of vinylidene fluoride, hexafluoropropylene, tetrafluoroethylene, perfluoroalkylvinylether, and mixtures thereof. Examples of fluoroplastics include polytetrafluoroethylene (PTFE); perfluoroalkoxy polymer resin (PFA); and copolymer of tetrafluoroethylene (TFE) and hexafluoropropylene (HFP), and mixtures thereof. The fluoroplastic provides chemical and thermal stability and has a low surface energy. The fluoroplastic has a melting temperature of from about 280° C. to about 400° C. or from about 290° C. to about 390° C. or from about 300° C. to about 380° C.

Fluoropolymers suitable for use as the release layer include fluoroelastomers suitable for use in the formulation described are from the class of 1) copolymers of two of vinylidenefluoride, hexafluoropropylene, and tetrafluoroethylene; such as those known commercially as VITON A®, 2) terpolymers of vinylidenefluoride, hexafluoropropylene, and tetrafluoroethylene such as those known commercially as VITON B®; and 3) tetrapolymers of vinylidenefluoride, hexafluoropropylene, tetrafluoroethylene, and a cure site monomer, such as those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1, 1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF®, NM® FOR-THF®, FOR-TFS® TH® NH®, P757® TNS®, T439®, PL958® BR9151® and TN505®, available from Ausimont.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer. The fluoroelastomers are cured at a temperature of from about 80° C. to about 250° C.

The carbon nanotubes in the in the release layer have a length of the of from about 1 micron to about 20 microns or from about 2 microns to about 15 microns or from about 5 microns to about 10 microns. The diameter of the carbon nanotubes is from about 1 nm to about 20 nm or from about 1 nm to about 10 nm or from about 2 nm to about 5 nm. The carbon nanotubes constitute from about 0.01 volume percent to about 45 volume percent of the release layer. Carbon nanotubes can be obtained from Cheaptubes.com.

The carbon nanotubes can also include single wall carbon nanotubes (SWCNTs), multi-wall carbon nanotubes (MW-CNTs), and their various functionalized and derivatized fibril forms such as carbon nanofibers. The nanotubes can have an aspect ratio, e.g., ranging from about 10 to about 1,000,000.

The carbon nanotubes can have various cross sectional shapes, such as, for example, rectangular, polygonal, oval, elliptical, or circular shape. Accordingly, the carbon nanotubes can have, for example, cylindrical three dimensional shapes.

Organic solvents suitable for the coating formulation in Block 706 of FIG. 7 include, but are not limited to, methyl ethyl ketone (MEK), methyl isobutyl ketone (MIBK), methyl-tertbutyl ether (MTBB), methyl n-amyl ketone (MAK), tetrahydrofuran (THF), Alkalis, methyl alcohol, ethyl alcohol, acetone, ethyl acetate, butyl acetate, or any other low molecular weight carbonyls, polar solvents, fireproof hydraulic fluids, along with the Wittig reaction solvents such as dimethyl formamide (DMF), dimethyl sulfoxide (DMSO) and N-methyl 2 pyrrolidone (NMP).

Fluoro-surfactants suitable for the coating formulation in Block 706 of FIG. 7 include the following: 3M: FC-4430, FC-4432, FC-4434 available from 3M; FS-10, FS-22, FS-30, FS-65, FS-31, FS-3100, FS-34, FS-35, FS-50, FS-51, FS-60, FS-61, FS-63, FS-64, FS-81, FS-83 available from Dupont; APFS-14, APFS-16, APFS 27-40, APFS-705, APFS-71S, APFS-74S, APFS-755, APFS-76S available from Advanced Polymer Inc; 5-111, S-500, S-103A, S-764P, S228M, S-760P, S761P, S106A, S-208M, S-216M, S-300, S-550, S-550-100, S-554, S-554-100, S-559, S-559-100 available from Chemguard; and AKF-290 available from Wacker.

Cross-linking agents or curing agents suitable for the coating formulation in Block 706 of FIG. 7 form elastomers that are relatively soft and display elastic properties. For example, when the polymer matrix uses a vinylidene-fluoride-containing fluoroelastomer, the curing agent can include, a bisphenol compound, a diamino compound, an aminophenol compound, an amino-siloxane compound, an amino-silane, and/or a phenol-silane compound. An exemplary bisphenol cross-linker can be VITON® Curative No. 50 (VC-50) available from E. I. du Pont de Nemours, Inc. VC-50 can be soluble in a solvent suspension and can be readily available at the reactive sites for cross-linking with, for example, VITON®-GF (E. I. du Pont de Nemours, Inc.).

After coating the fluoropolymer/CNT composition, the coating is heated to a temperature of from about 150° C. to about 360° C. or from about 200° C. to about 330° C. to melt or cure the fluoropolymer particles and form a surface layer or release layer.

The release layer is polished to a surface roughness of from about 0.6 microns to about 1.3 microns using Using the method described herein allows for reduction of the carbon nanotube fluoropolymer cluster size and amount in the fluoropolymer/CNT composition. The clusters are agglomerates of CNTs and fluoropolymer. The clusters occur because the CNTs are not dispersed evenly through the fluoropolymer/CNT composition. The size of the clusters is reduced to about 5 micron to about 250 microns, or in embodiments from about 25 microns to about 150 microns. The size of the clusters is measured by taking the longest distance of the agglomerate or cluster. The carbon nanotube fluoropolymer clusters are reduced in the release layer to from about 0.01 volume percent to about 15 volume percent, or in embodiments to about 0.01 volume percent to about 5 volume percent or form about 0.01 to about 3.5 volume percent.

Another way to characterize the reduction of clusters is by measuring the number of clusters visible per unit area on the surface. The characterization of nano-material surface characteristics using contrast enhancing lighting and ImagePro image analysis software is one such method.

A fluoropolymer/CNT composite coating surface is placed in a light microscope using dark field microscopy or any contrast enhancing lighting technique. Using a 10× or similar objective, any light altering filter or device, and a camera that can capture and digitally transfer that image to any computer or device, an area or 1 micron squared or larger, including multiple images used separately or together, are then transferred to image image manipulating software ie; ImagePro or similar. Using ImagePro image analysis software, similar image analysis software, or any digital manipulation of the image that allows delineation of varying pixel densities that variation of pixel density (contrast) is used to delineate areas of varying nano-material density. Using ImagePro image analysis software or similar adjusting the image quality, contrast, black level, white balance, or similar to enhance the ability of the software to quantify the delineation between nano-materials and non-nano-materials. Using ImagePro imagae analysis software or similar image analysis software the digital image is measured to quantify the dispersion quality and to quantify the nano-material shape, aspect ratio, size distribution, or any other defining characteristic.

The shapes of the clusters are irregular and the image obtained is a one dimensional slice of the cluster. The volume of the clusters in the entire sampled area can range from 0.01 volume percent to about 45 volume percent prior to mixing. The method described herein reduces that by an order of magnitude, that is, to about 0.01 to less than 3.5 volume percent. This is a substantial improvement. In the example provided the volume percent of clusters in our final coating was from about 0.7 volume percent to 0.06 volume percent.

The mechanical properties of the fluoropolymer/carbon nanotube release layer provide for a composite modulus from about 2,000 psi to about 10,000 psi, a composite toughness from about 2,500 (in.-lbs./in.3) to about 5,000 (in.-lbs./in.3), and a composite tear strength from about 200 (lbs./in.) to about 400 (lbs./in.).

The thermal properties of the fluoropolymer/carbon nanotube release layer provide for a thermal diffusivity from about 0.01 (mm$^2$/s) to about 0.5 (mm$^2$/s), and a thermal conductivity from about 0.2 W/(m*K) to about 1.0 W/(m*K). The thermal properties of the fluoropolymer/carbon release layer were measured using the Xenon flash lamp based NanoFlash™. This instrument uses optical coupling to heat and read the sample surfaces, eliminating potential interface thermal resistance, and making accurate measurement of thin samples, coatings on a substrate and materials in a thin film or sandwich possible. The instrument measures thermal diffusivity ($\alpha$) and specific heat ($C_p$) simultaneously. The software uses these values and the bulk density ($\rho$) to calculate thermal conductivity ($\lambda$) from the equation: $\lambda = \alpha \rho C_p$. A mathematical analysis of the measured temperature/time function allows the determination of the thermal diffusivity, $\alpha$. The adiabatic model was used in this instance as it replaces troublesome measurements of thermal parameters such as absolute temperature increase and/or heart quantity with a more accurate, direct and fast measurement of time and relative temperature increase.

The mixing is accomplished using twin screw extruder or 2 roll mills. Each batch mixing step takes from about Specific embodiments will now be described in detail. These examples are intended to be illustrative, and not limited to the materials, conditions, or process parameters set forth in these embodiments. All parts are percentages by solid weight unless otherwise indicated.

While embodiments have been illustrated with respect to one or more implementations, alterations and/or modifications can be made to the illustrated examples without departing from the spirit and scope of the appended claims. In addition, while a particular feature herein may have been disclosed with respect to only one of several implementations, such feature may be combined with one or more other features of the other implementations as may be desired and advantageous for any given or particular function.

EXAMPLES

Control release layers were prepared with fluoropolymer/CNT composition prepared as follows. Carbon nanotubes were incorporated into a fluoropolymer polymer matrix (Viton GF® available from Dupont) at 12 weight percent based on the total weight of the composition by twin-screw extrusion. Fluoropolymer was added to the 12 weight percent CNT fluoropolymer/CNT composition to reduce the weight percent of the carbon nanotubes to 4 weight percent. This was done with a done 2-roll mill by adding the required amount of raw polymer to the originally extruded polymer/CNT composition. The 4 weight percent fluoropolymer/CNT composition was mixed 6 additional times in the 2-roll mill. The composition was then coated on a substrate and cured. The cured layers were then polished. These control release layers are labeled Prod B1-1, Prod B1-2, Prod-B1-3, Prod A2, Prod A1, Prod-C2, Prod-C2 and Prod=A1 in FIG. 8.

Figure 8:
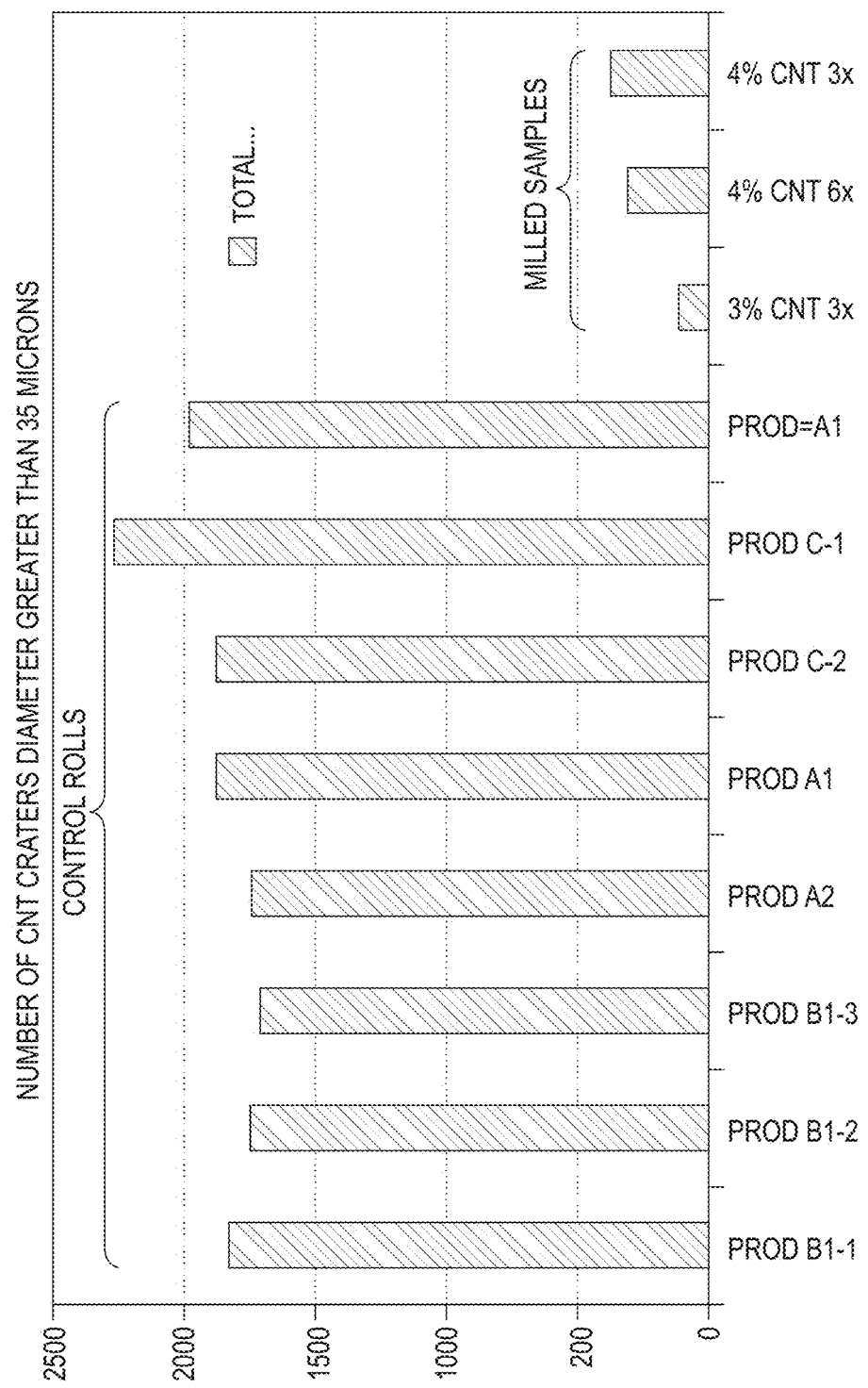
FIG. 8 shows the number of craters having a diameter greater than 35 microns in various fuser surface layers.

Experimental samples were prepared by incorporated carbon nanotubes into a fluoropolymer polymer matrix at 12 weight percent based on the total weight of the composition by twin-screw extrusion. The 12 weight percent composition was then subjected to 6 additional mixing steps with a 2-roll mill. Fluoropolymer was added to the 12 weight percent CNT fluoropolymer/CNT composition to reduce the weight percent of the carbon nanotubes to 3 or 4 weight percent. The sample labeled 3% CNT 3x (FIG. 8) was mixed 3 additional times on a 2 roll mill and then coated on a substrate. The sample labeled 4% CNT 6x (FIG. 8) was mixed 6 additional times on a 2 roll mill and then coated on a substrate. The sample labeled 4% CNT 3x (FIG. 8) was mixed 3 additional times on a 2 roll mill and then coated on a substrate and cured. The coatings were than polished in the same manner as the control samples FIG. 8 shows the number of craters in the control sample release layer and the experimental sample release layers. The number of craters having a diameter greater than 35 microns within the topcoat surface was measured for all samples. The number of craters has been dramatically reduced using the extra mixing steps at the high load fluoropolymer/CNT composition. The reduction in the number of craters is a result of the reduction in the amount and size of carbon nanotube fluoropolymer cluster which reduces toner buildup and reduces contamination.

The relative physical and performance properties were collected for the control samples and the experimental samples. Thermal diffusivity properties @ 200° C. were comparable for the experimental samples and the control samples. In addition, the mechanical properties of tensile strength, elongation, toughness and initial modulus were comparable to the control samples.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled the in the art which are also encompassed by the following claims.

What is claimed is:

1. A method of making a fuser member suitable for use with an image forming system, comprising:
   mixing a high load fluoropolymer/carbon nanotube composition wherein the carbon nanotubes comprise from about 8 weight percent to about 30 weight percent of the high load composition in a mixer;
   mixing the high load fluoropolymer/carbon nanotube composition in a high shear mixer and mixing the high load fluoropolymer/carbon nanotube composition for 3 or more times;
   adding more of the fluoropolymer to the high load fluoropolymer/carbon nanotube composition to form a low load fluoropolymer/carbon nanotube composition wherein the carbon nanotubes comprise from about 0.1 weight percent to about 7 weight percent of the low load composition;
   mixing the low load fluoropolymer/carbon nanotube composition in a rubber compounding mixer for 3 or more times;
   coating the low load fluoropolymer/carbon nanotube composition on an intermediate layer disposed on a fuser substrate;
   curing the coated low load fluoropolymer/carbon nanotube composition to form a fuser release layer on the fuser substrate; and
   polishing the fuser release layer to a surface roughness of from about 0.6 microns to about 1.2 microns, wherein the fuser release layer comprises the fluoropolymer, a plurality of the carbon nanotubes, each carbon nanotube having an aspect ratio ranging from about 10 to about 1,000,000, each carbon nanotube having a diameter of from 1 nanometer to about 20 nanometers; and carbon nanotube fluoropolymer clusters having a size ranges from about 5 micron to about 250 micron;
   and wherein the carbon nanotube fluoropolymer clusters are from about 0.01 volume percent to about 15 volume percent of the surface layer.

2. The method of claim 1, wherein the fluoropolymer comprises a fluoroelastomer selected from the group consisting of copolymers of: vinylidenefluoride, hexafluoropropylene and tetrafluoropropylene and tetrafluoroethylene, terpolymers of vinylidenefluoride, hexafluoropropylene and tetrafluoroethylene, and tetrapolymers of vinylidenefluoride, hexafluoropropylene, tetrafluoroethylene, and a cure site monomer.

3. The method of claim 1, wherein the fluoropolymer comprises a fluoroplastic selected from the group consisting of: polytetrafluoroethylene (PTFE); perfluoroalkoxy polymer resin (PFA); copolymers of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); tetrapolymers of tetrafluoroethylene (TFE), vinylidene fluoride (VF2), and hexafluoropropylene (HFP) and a cure site monomer; and mixtures thereof.

4. The method of claim 1, wherein the fluoropolymer comprises a perfluoropolyether.

5. The method of claim 1, wherein the fuser substrate comprises a material selected from the group consisting of: polyimide, polyaramide, polyether ether ketone, polyetherimide, polyphthalamide, polyamide-imide, polyketone, polyphenylene sulfide, fluoropolyimides, fluoropolyurethanes, aluminum, nickel and stainless steel.

6. The method of claim 1, wherein the curing is at a temperature of from about 150° C. to about 360° C.

7. The method of claim 1, wherein the carbon nanotubes are selected from the group consisting of single wall carbon nanotubes or multi-wall carbon nanotubes.

8. The method of claim 1, wherein an organic solvent is added to the low load fluoropolymer/carbon nanotube composition prior to coating.

9. The method of claim 8, wherein the organic solvent is selected from the group consisting of: methyl ethyl ketone (MEK), methyl isobutyl ketone (MIBK), methyl-tertbutyl ether (MTBB), methyl n-amyl ketone (MAK), tetrahydrofuran (THF), methyl alcohol, ethyl alcohol, acetone, ethyl acetate, butyl acetate, low molecular weight carbonyls, dimethyl formamide (DMF), dimethyl sulfoxide (DMSO) and N-methyl 2 pyrrolidone (NMP).

10. The method of claim 1, wherein a fluoro-surfactant is added to the low load fluoropolymer/carbon nanotube composition prior to coating.

11. A surface layer comprising:
a fluoropolymer, a plurality of carbon nanotubes, each carbon nanotube having an aspect ratio ranging from about 10 to about 1,000,000, each carbon nanotube having a diameter of from 1 nanometer to about 20 nanometers; and carbon nanotube fluoropolymer clusters having a size ranges from about 5 micron to about 250 micron; and wherein the carbon nanotube fluoropolymer clusters are from about 0.01 volume percent to about 15 volume percent of the surface layer, wherein the surface layer is formed by mixing a high load fluoropolymer/carbon nanotube composition in a high shear mixer and mixing the high load fluoropolymer/carbon nanotube composition for 3 or more times wherein the high load fluoropolymer/carbon nanotube composition comprises from about 8 weight percent to about 30 weight percent of the high load composition;
adding more of the fluoropolymer to the high load fluoropolymer/carbon nanotube composition to form a low load fluoropolymer/carbon nanotube composition wherein the carbon nanotubes comprise from about 0.1 weight percent to about 7 weight percent of the low load composition;
mixing the low load fluoropolymer/carbon nanotube composition in a rubber compounding mixer for 3 or more times; and coating the low load composition and curing to form the surface layer, wherein the surface layer has a surface roughness of from about 0.6 microns to about 1.2 microns.

12. The surface layer of claim 11, wherein each of the plurality of carbon nanotubes is selected from the group consisting of: a single wall carbon nanotube (SWCNT), and a multi-wall carbon nanotube (MWCNT).

13. The surface layer of claim 11, wherein an organic solvent is added to the low load composition prior to coating.

14. A fuser member comprising:
a substrate layer;
an intermediate layer disposed on the substrate layer; and
a release layer disposed on the intermediate layer, the release layer comprising; a fluoropolymer, a plurality of carbon nanotubes, each carbon nanotube having an aspect ratio ranging from about 10 to about 1,000,000, each carbon nanotube having a diameter of from 1 nanometer to about 20 nanometers; and carbon nanotube fluoropolymer clusters having a size ranges from about 5 micron to about 250 micron; and wherein the carbon nanotube fluoropolymer clusters are from about 0.01 volume percent to about 15 volume percent of the release layer, wherein the release layer is formed by mixing a high load fluoropolymer/carbon nanotube composition in a high shear mixer and mixing the high load fluoropolymer/carbon nanotube composition for 3 or more times wherein the high load fluoropolymer/carbon nanotube composition comprises from about 8 weight percent to about 30 weight percent of the high load composition;
adding more of the fluoropolymer to the high load fluoropolymer/carbon nanotube composition to form a low load fluoropolymer/carbon nanotube composition wherein the carbon nanotubes comprise from about 0.1 weight percent to about 7 weight percent of the low load composition;
mixing the low load fluoropolymer/carbon nanotube composition in a rubber compounding mixer for 3 or more times; and coating the low load composition and curing to form the release layer, wherein the release layer has a surface roughness of from about 0.6 microns to about 1.2 micron.

15. The fuser member of claim 14 wherein each of the plurality of carbon nanotubes is selected from the group consisting of: a single wall carbon nanotube (SWCNT), and a multi-wall carbon nanotube (MWCNT).

16. The fuser member of claim 14 wherein the release layer has a thermal diffusivity from about 0.01 (mm$^2$/s) to about 0.5 (mm$^2$/s), and a thermal conductivity from about 0.2 W/(m*K) to about 1.0 W/(m*K).

17. The fuser member of claim 14 wherein the release layer has a composite modulus from about 2,000 psi to about 10,000 psi.

18. The fuser member of claim 14 wherein the release layer has a composite toughness from about 2,500 (in.-lbs/in.$^3$) to about 5,000 (in.-lbs/in.$^3$).

19. The fuser member of claim 14 wherein the release layer has a composite tear strength from about 200 (lbs./in.) to about 400 (lbs./in.).

20. The fuser member of claim 14, wherein an organic solvent is added to the low load composition prior to coating.

* * * * *